(12) United States Patent
Hirayama et al.

(10) Patent No.: US 10,508,318 B2
(45) Date of Patent: Dec. 17, 2019

(54) METHOD FOR THERMALLY TREATING RING-SHAPED MEMBER

(71) Applicants: NTN CORPORATION, Osaka (JP); Eri Hirayama, Shizuoka (JP); Tsuneaki Hiraoka, Shizuoka (JP); Shintaro Suzuki, Shizuoka (JP)

(72) Inventors: Eri Hirayama, Shizuoka (JP); Tsuneaki Hiraoka, Shizuoka (JP); Shintaro Suzuki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 819 days.

(21) Appl. No.: 15/022,650

(22) PCT Filed: Sep. 8, 2014

(86) PCT No.: PCT/JP2014/073617
§ 371 (c)(1),
(2) Date: Mar. 17, 2016

(87) PCT Pub. No.: WO2015/045822
PCT Pub. Date: Apr. 2, 2015

(65) Prior Publication Data
US 2016/0230244 A1    Aug. 11, 2016

(30) Foreign Application Priority Data

Sep. 30, 2013   (JP) ................ 2013-204258

(51) Int. Cl.
*C21D 9/40*   (2006.01)
*C21D 1/10*   (2006.01)
(Continued)

(52) U.S. Cl.
CPC ............. *C21D 9/40* (2013.01); *C21D 1/10* (2013.01); *C21D 1/42* (2013.01); *C21D 1/58* (2013.01)

(58) Field of Classification Search
CPC ... C21D 1/10; C21D 9/40; C21D 1/42; C21D 1/58
(Continued)

(56) References Cited

U.S. PATENT DOCUMENTS

| 2,417,610 A | 3/1947 | Phillips |
| 4,307,276 A | 12/1981 | Kurata et al. |

(Continued)

FOREIGN PATENT DOCUMENTS

| CN | 201089778 | 7/2008 |
| CN | 202009508 | 10/2011 |

(Continued)

OTHER PUBLICATIONS

J.R. Davis, Friction and Wear of Internal Combustion Engine Parts, Friction, Lubrication, and Wear Technology, vol. 18, ASM Handbook, ASM International, 1992, p. 553-562. (Year: 1992).*

(Continued)

*Primary Examiner* — Brian D Walck
(74) *Attorney, Agent, or Firm* — Wenderoth, Lind & Ponack, L.L.P.

(57) ABSTRACT

When a plurality of outer rings (R) are sequentially and inductively heated to a target temperature by energizing a heating coil (2) elongated more than each of the plurality of outer rings (R), which are made of steel and retained coaxially by a retaining unit (3), while relatively moving the outer rings (R) and the heating coil (2) in an axial direction, an output of the heating coil (2) is varied in consideration of the number of outer rings (R) present in an opposing region of the heating coil (2).

4 Claims, 3 Drawing Sheets

(51) Int. Cl.
C21D 1/42 (2006.01)
C21D 1/58 (2006.01)

(58) Field of Classification Search
USPC .......................................................... 148/575
See application file for complete search history.

(56) References Cited

U.S. PATENT DOCUMENTS

2016/0208353 A1* 7/2016 Hiraoka ................... C21D 9/40
2016/0230243 A1* 8/2016 Hiraoka ................... C21D 9/40

FOREIGN PATENT DOCUMENTS

| | | |
|---|---|---|
| JP | 52-67043 | 6/1977 |
| JP | 54-56908 | 5/1979 |
| JP | 58-55526 | 4/1983 |
| JP | 1-182668 | 7/1989 |
| JP | 2002-371316 | 12/2002 |
| JP | 2006-200019 | 8/2006 |

OTHER PUBLICATIONS

International Search Report dated Oct. 7, 2014 in International (PCT) Application PCT/JP2014/073617.
Chinese Search Report with Chinese Office Action dated Jan. 23, 2017 in corresponding Chinese Application No. 201480053754.1 (with partial English translation).
Extended European Search Report dated May 8, 2017 in corresponding European Application No. 14848257.3.
International Preliminary Report on Patentability and Written Opinion of the International Searching Authority dated Apr. 5, 2016 in International (PCT) Application No. PCT/JP2014/073617.

* cited by examiner

|  | FIVE OUTER RINGS ARRANGED ON HEATING START SIDE | FIVE OUTER RINGS ARRANGED AT VICINITY OF CENTER PORTION | FIVE OUTER RINGS ARRANGED ON HEATING FINISH SIDE |
|---|---|---|---|
| COMPARATIVE EXAMPLE | 920~1023°C | 868~894°C | 910~1044°C |
| EXAMPLE | 883~897°C | 863~884°C | 866~890°C |

TARGET TEMPERATURE: 850~900°C

METHOD FOR THERMALLY TREATING RING-SHAPED MEMBER

TECHNICAL FIELD

The present invention relates to a heat treatment method for a ring-shaped member.

BACKGROUND ART

As is well known, in a process of manufacturing a steel ring-shaped member (such as a raceway ring of a rolling bearing), heat treatment (quench hardening) is carried out on the ring-shaped member so as to impart required mechanical strength and the like to the ring-shaped member. The quench hardening involves a heating step of heating the ring-shaped member to a target temperature (for example, to a temperature range equal to or higher than an $A_1$ transformation point), and a cooling step of cooling the ring-shaped member heated to the target temperature. The heating step can be carried out using, for example, an atmosphere heating furnace such as a mesh belt continuous furnace.

The atmosphere heating furnace has an advantage of being capable of heating a large number of workpieces at the same time. However, the atmosphere heating furnace needs to heat not only a workpiece but also the atmosphere. Hence, the atmosphere heating furnace has a problem of low energy efficiency. In this context, in the heating step, a workpiece may be heated to the target temperature by induction heating (for example, see Patent Literature 1). By the induction heating, a workpiece can be directly heated, thereby being capable of achieving high energy efficiency. Further, when a workpiece to be heated is a ring-shaped member, as described in Patent Literature 1, there may be adopted a method of energizing a heating coil under a state in which a plurality of ring-shaped members retained coaxially with each other are arranged in an opposing region (inner periphery) of the heating coil. In this method, the plurality of ring-shaped members can be inductively heated at the same time, thereby being capable of increasing efficiency of heat treatment.

CITATION LIST

Patent Literature 1: JP 2006-200019 A

SUMMARY OF INVENTION

Technical Problem

Incidentally, a continuous heating method involving continuously and inductively heating each longitudinal portion of an elongated workpiece such as a billet by causing the workpiece to pass through an opposing region of an energized heating coil has an advantage of being capable of efficiently soaking the elongated workpiece. Accordingly, the inventors of the present invention attempted to inductively heat a plurality of ring-shaped members by the above-mentioned continuous heating method. Specifically, the inventors of the present invention attempted to sequentially and inductively heat a plurality of ring-shaped members to a target temperature by relatively moving, in the axial direction, the plurality of ring-shaped members retained coaxially with each other, and a heating coil that was elongated more than each of the ring-shaped members and energized so as to have a constant output.

However, in this way, of the plurality of ring-shaped members retained coaxially with each other, particularly ring-shaped members arranged at an end on a heating start side and a heating finish side and at the vicinity of the end were heated to temperatures exceeding the target temperature (overheated). It is difficult for the overheated ring-shaped members to keep desired mechanical strength and the like. Thus, the overheated ring-shaped members need to be disposed of. Therefore, there arises a problem of reduction in yield of products.

In view of the above-mentioned circumstances, it is an object of the present invention to provide a method capable of efficiently quench-hardening a steel ring-shaped member and of properly carrying out the quench hardening while minimizing defective products.

Solution to Problem

As a result of conducting earnest research, the inventors of the present application found out that the above-mentioned problem of overheating arose because the heating coil was energized so as to keep the constant output. That is, when carrying out the continuous heating, the inventors of the present application set the output of the heating coil to a constant value capable of heating all of the ring-shaped members to the target temperature under a state in which the ring-shaped members were present in an entire opposing region of the heating coil (under a state in which an inner periphery of the heating coil was filled with the ring-shaped members). However, in this way, the inventors of the present application found out that at a stage immediately after start of the heating step and a stage immediately before finish of the heating step, at which the ring-shaped members were only present in a part of the opposing region of the heating coil, amounts of induced currents generated in the respective ring-shaped members were increased, with the result that the ring-shaped members were overheated.

According to one embodiment of the present invention, which is devised based on such findings, there is provided a heat treatment method for a ring-shaped member, comprising a heating step of sequentially and inductively heating a plurality of ring-shaped members to a target temperature by energizing a heating coil elongated more than each of the plurality of ring-shaped members, which are made of steel and retained coaxially with each other, while relatively moving the plurality of ring-shaped members and the heating coil in an axial direction of the each of the plurality of ring-shaped members, the heating step comprising varying an output of the heating coil in consideration of a number of ring-shaped members present in an opposing region of the heating coil.

As described above, when the output of the heating coil is varied in consideration of the number of the ring-shaped members present in the opposing region of the heating coil, even at the stage immediately after start of the heating step and the stage immediately before finish of the heating step, at which the ring-shaped members are only present in a part of the opposing region of the heating coil, amounts of induced currents generated in the respective ring-shaped members can be optimized. Accordingly, the ring-shaped members can be effectively prevented from being heated to a temperature exceeding the target temperature. Alternatively, the ring-shaped members can be effectively prevented from being heated insufficiently. Further, in this manner, as compared to a case of energizing the heating coil so as to keep the constant output, a power consumption amount can be reduced, thereby being capable of reducing a cost needed for heat treatment. On the other hand, the heating step is carried out by so-called continuous heating. Accordingly, operations and effects attained by adopting the continuous heating method, specifically, for example, operations and effects capable of soaking the respective ring-shaped members, and of efficiently carrying out heat treatment can be effectively attained. Therefore, according to the one embodiment of the present invention, quench hardening of the steel ring-shaped members can be efficiently carried out, and can be properly carried out while minimizing defective products.

As a specific measure for effectively attaining the operations and effects described above, it is conceivable that the heating step comprises: an output increasing step of increasing the output of the heating coil in a stepped manner; and an output decreasing step of decreasing the output of the heating coil in a stepped manner. Further, in this case, it is preferred that an output increase pattern of the heating coil in the output increasing step and an output decrease pattern of the heating coil in the output decreasing step be different from each other. This is because an electric conductivity and magnetism of a workpiece to be heated change along with temperature rise, that is, a temperature rise pattern of the ring-shaped members changes in accordance with a degree of progress of the heating step. Note that, the description "the output increase pattern of the heating coil in the output increasing step and the output decrease pattern of the heating coil in the output decreasing step are different from each other" means that the two output patterns of the heating coil in the both steps do not conform to each other when any one of the output patterns is reversed horizontally and then superposed on another one of the output patterns (for example, see FIG. 3).

The heat treatment method according to the one embodiment of the present invention may further comprise a cooling step of cooling the ring-shaped member inductively heated to the target temperature. With this, the ring-shaped members can be properly quench-hardened.

The heat treatment method according to the one embodiment of the present invention is particularly suitably applicable to a case where the ring-shaped member is made of steel having a carbon content of 0.8 mass % or more.

Advantageous Effects of Invention

As described above, according to the one embodiment of the present invention, it is possible to efficiently quench-harden the steel ring-shaped member and to properly carry out the quench hardening while minimizing defective products. Thus, it is possible to contribute to the reduction in manufacturing cost of the steel ring-shaped member such as a raceway ring of a rolling bearing.

DESCRIPTION OF EMBODIMENTS

Now, an embodiment of the present invention is described with reference to the drawings.

Figure 1:
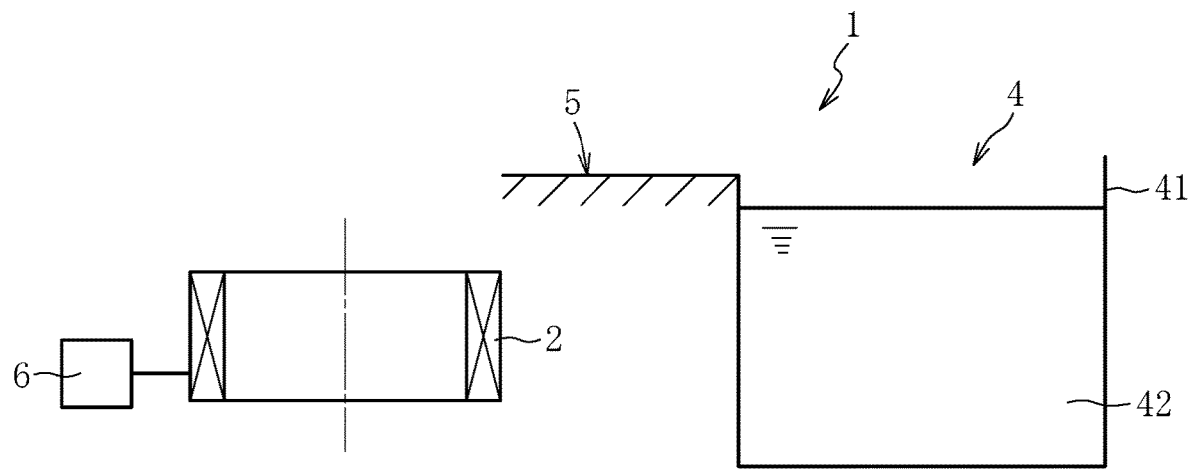
FIG. 1 is a schematic view for illustrating an initial state of a heat treatment apparatus to be used when carrying out a heat treatment method according to the present invention.
Figure 1:
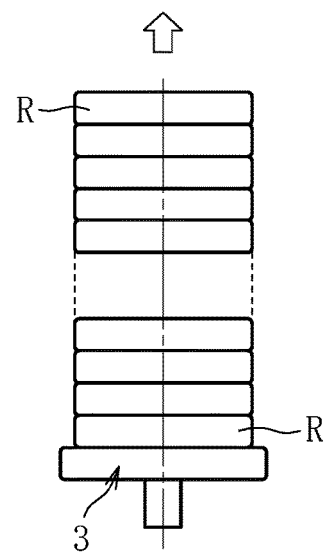

FIG. 1 is a schematic view for illustrating an initial state of a heat treatment apparatus to be used when carrying out a heat treatment method for a ring-shaped member according to the present invention. A heat treatment apparatus 1 illustrated in FIG. 1 is a heat treatment apparatus configured to quench-harden an outer ring R of a rolling bearing as an example of a steel ring-shaped member, and sequentially carries out a heating step S1, a conveying step S2, and a cooling step S3 illustrated in FIG. 2 on the outer ring R. The heat treatment apparatus 1 mainly comprises a heating coil 2 and a retaining unit 3 to be used in the heating step S1, a conveyor 5 to be used in the conveying step S2, and a cooling unit 4 to be used in the cooling step S3. The heating coil 2 and the retaining unit 3 are arranged coaxially with each other.

The retaining unit 3 can retain a plurality of outer rings R coaxially thereon (retain a plurality of outer rings R in a state of being arrayed in an axial direction so that center axes thereof are aligned). The retaining unit 3 according to this embodiment retains the plurality of outer rings R in a vertically stacked state so that the center axes of the outer rings R are aligned. In the initial state of the heat treatment apparatus 1 illustrated in FIG. 1, the retaining unit 3 (and the plurality of outer rings R retained coaxially by the retaining unit 3) is arranged below the heating coil 2 at a predetermined distance from the heating coil 2. The retaining unit 3 is movable in the axial direction relatively to the heating coil 2. In this embodiment, the retaining unit 3 is connected to a driver (not shown), and the retaining unit 3 is pitch-fed (continuously fed in an intermittent manner) in accordance with an output of the driver. An amount of feeding the retaining unit 3 per pitch is set to, for example, a length equal to an axial dimension of each of the outer rings R to be heated.

The heating coil 2 can surround the outer ring R to be heated from a radially outer side of the outer ring R. An axial dimension of the heating coil 2 is set to be larger than that of the outer ring R to be heated. In this case, the heating coil 2 capable of arranging four outer rings R in an inner periphery thereof (capable of heating four outer rings R at the same time) is used. The heating coil 2 is electrically connected to a high-frequency power source 6.

Figure 3:
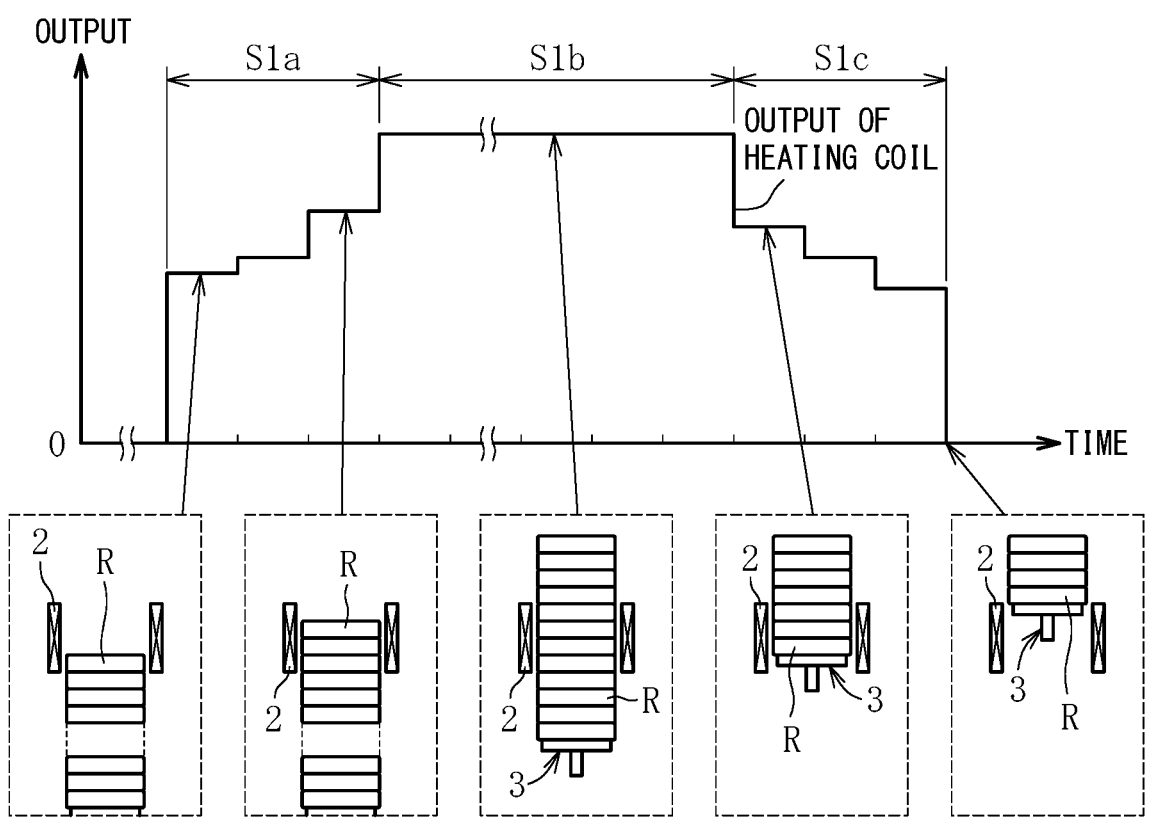
FIG. 3 is a graph for showing a variation pattern of an output of a heating coil to be used in a heating step.

As shown in FIG. 3, an output of the heating coil 2 (amount of electric power supplied from the high-frequency power source 6 to the heating coil 2) is set so as to vary in accordance with a degree of progress of the heating step S1. More specifically, the output of the heating coil 2 varies in consideration of the number of the outer rings R present in the opposing region (inner periphery) of the heating coil 2 (in accordance with the number of the outer rings R present in the opposing region of the heating coil 2 in this case). Note that, the number of the outer rings R present in the opposing region of the heating coil 2 can be specified based on, for example, an axial relative position of the retaining unit 3 with respect to the heating coil 2. In the heating step S1, there are sequentially carried out an output increasing step S1a of increasing the output of the heating coil 2 in a stepped manner, an intermediate step S1b of keeping the output of the heating coil 2 to a constant value, and an output decreasing step S1c of decreasing the output of the heating coil 2 in a stepped manner.

In this embodiment using the heating coil 2 capable of accommodating, in the inner periphery thereof, the four outer rings R retained coaxially with each other, the intermediate step S1b is carried out continuously while the four outer rings R are present in the opposing region of the heating coil 2. Further, assuming that the output of the heating coil 2 during the intermediate step S1b is 100%, after the heating step S1 is started (after the plurality of outer rings R retained coaxially by the retaining unit 3 are started to move upward), the output increasing step S1a according to this embodiment is carried out so as to increase the output of the heating coil 2 in the order of 55%, 60%, and 75% every time the number of the outer rings R present in the opposing region (inner periphery) of the heating coil 2 increases by one. On the other hand, the output decreasing step S1c is carried out immediately before the finish of the heating step S1. In this embodiment, the output decreasing step S1c is carried out so as to decrease the output of the heating coil 2 in the order of 70%, 60%, and 50% every time the number of the outer rings R present in the opposing region of the heating coil 2 decreases by one. Note that, the variation pattern of the output of the heating coil 2 is not limited to the above-mentioned pattern. That is, the variation pattern of the output of the heating coil 2 is set as appropriate depending on a shape, a size, and the like of the ring-shaped member to be heated.

The cooling unit 4 comprises a cooling liquid bath 41 configured to store therein a cooling liquid (such as a quenching oil) 42 kept at an appropriate temperature. The conveyor 5 has a role of conveying, into the cooling liquid bath 41, the outer ring R inductively heated to the target temperature in the heating step S1.

Now, description is made of procedures of quench-hardening the ring-shaped member R, which are carried out using the above-mentioned heat treatment apparatus 1.

Prior to carrying out the quench hardening, a step of manufacturing the ring-shaped member is carried out, thereby manufacturing the outer ring R as the ring-shaped member. Specifically, for example, a steel material having a carbon content of 0.8 mass % or more (SUJ2 classified as bearing steel specified in JIS G4805 in this case) is prepared, and the steel material is subjected to plastic working such as forging, and to machining such as turning and grinding. Thus, the outer ring R having a predetermined ring shape in general is manufactured. As the steel having the carbon content of 0.8 mass % or more, in addition to SUJ2, SUJ3 classified as the same bearing steel as SUJ2, SKD11, SKD12, SKD3, and SKD31 classified into tool steel specified in JIS G4404, and the like can be exemplified.

Figure 2:
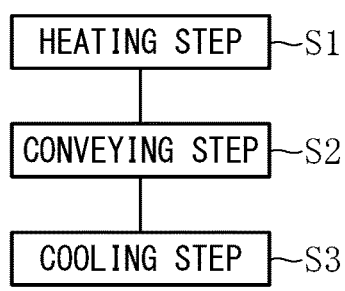
FIG. 2 is a flowchart for illustrating steps of quench-hardening.

Next, the quench hardening is carried out using the above-mentioned heat treatment apparatus 1. As illustrated in FIG. 2, the quench hardening comprises the heating step S1 of inductively heating, to the target temperature, the outer ring R manufactured in the step of manufacturing the ring-shaped member, the conveying step S2 of conveying, into the cooling unit 4 (cooling liquid bath 41), the outer ring R heated to the target temperature, and the cooling step S3 of cooling and quench-hardening the outer ring R.

(A) Heating Step S1

In the heating step S1, the plurality of outer rings R retained coaxially by the retaining unit 3 are sequentially heated to the target temperature (to a temperature range exceeding an $A_1$ transformation point in this case). That is, in the heating step S1, first, the plurality of outer rings R are stacked vertically on the retaining unit 3 so that the center axes of the outer rings R are aligned. Each outer ring R has the axial dimension smaller than a radial dimension thereof. Accordingly, when the outer rings R are stacked vertically as in this embodiment, there is an advantage in that postures of the outer rings R are stabilized while carrying out the heating step S1. Although detailed illustration is omitted, work of stacking the plurality of outer rings R on the retaining unit 3 can be carried out automatically.

After the retaining unit 3 retains the plurality of outer rings R coaxially, the driver (not shown) is operated to continuously apply a force of feeding the retaining unit 3 vertically upward. Along with this, the plurality of outer rings R retained coaxially by the retaining unit 3 enter the opposing region of the heating coil 2 sequentially (one by one). At this time, electric power is supplied from the high-frequency power source 6 to the heating coil 2 so as to vary the output of the heating coil 2 in the pattern shown in FIG. 3. Then, each outer ring R is inductively heated to the target temperature (to the temperature range exceeding the $A_1$ transformation point) while passing through the opposing region of the heating coil 2.

(B) Conveying Step S2

Figures 4, 5:
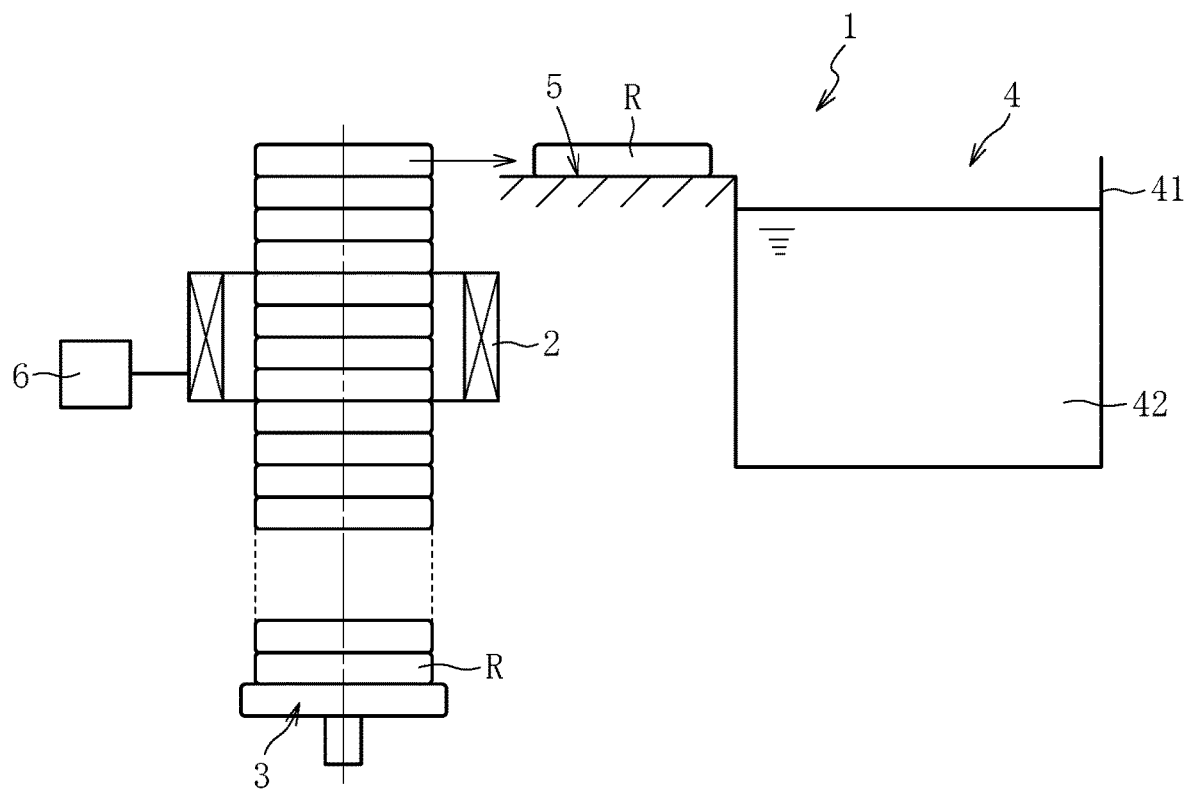
FIG. 4 is a schematic view for illustrating an in-use state of the heat treatment apparatus illustrated in FIG. 1.
FIG. 5 is a table for showing results of comparative verification between the related-art method and the method according to the present invention.

In the conveying step S2, as illustrated in FIG. 4, the outer rings R heated to the target temperature are sequentially conveyed by the conveyor 5 into the cooling unit 4 (cooling liquid bath 41).

(C) Cooling Step S3

In the cooling step S3, the outer ring R conveyed by the conveyor 5 into the cooling liquid bath 41 is immersed in the cooling liquid 42 stored in the cooling liquid bath 41. Thus, the outer ring R is cooled from the temperature range equal to or higher than the $A_1$ transformation point to a temperature range equal to or lower than an Ms point, thereby being quench-hardened.

Through the above-mentioned procedures, the quench hardening of the outer ring R using the heat treatment apparatus 1 is completed. Then, the outer ring R after completion of the quench hardening is subjected to predetermined processes such as tempering and various kinds of finishing, thereby being formed into a finished product.

As described above, in the present invention, the heating coil 2 is energized while the plurality of outer rings R retained coaxially by the retaining unit 3 are caused to pass through the opposing region of the heating coil 2 elongated more than each of the outer rings R. Thus, in the heating step S1 of sequentially and inductively heating the plurality of outer rings R to the target temperature, the output of the heating coil 2 is varied in consideration of the number of the outer rings R present in the opposing region of the heating coil 2 (in accordance with the number of the outer rings R). In this manner, even at a stage immediately after start of the heating step S1 and a stage immediately before finish of the heating step S1, at which the outer rings R are only present in a part of the opposing region of the heating coil 2, amounts of induced currents generated in the respective outer rings R can be optimized. Accordingly, the outer rings R can be effectively prevented from being heated to a temperature exceeding the target temperature. Alternatively, the outer rings R can be effectively prevented from being heated insufficiently. Further, in this manner, as compared to a case of energizing the heating coil 2 so as to keep the constant output, a power consumption amount can be reduced, thereby being capable of reducing a cost needed for heat treatment. On the other hand, the heating step S1 is carried out by so-called continuous heating. Accordingly, operations and effects attained by adopting the continuous heating method, specifically, for example, operations and effects capable of soaking the respective outer rings R, and of efficiently carrying out heat treatment can be effectively attained. Therefore, according to the present invention, quench hardening of the steel ring-shaped member such as the outer ring R of a rolling bearing can be efficiently carried out, and can be properly carried out while minimizing defective products.

Particularly in this embodiment, the output increasing step S1a of increasing the output of the heating coil 2 in a stepped manner is arranged at an initial stage of the heating step S1, and the output decreasing step S1c of decreasing the output of the heating coil 2 in a stepped manner is arranged at a stage immediately before finish of the heating step S1. Further, an output increase pattern of the heating coil 2 in the output increasing step S1a and an output decrease pattern of the heating coil 2 in the output decreasing step S1c are different from each other. That is, as shown in FIG. 3, the output patterns of the heating coil 2 in the both steps S1a and S1c do not conform to each other when any one of the output patterns is reversed horizontally and then superposed on another one of the output patterns. The reason why the output patterns are set in this manner is that an electric conductivity and magnetism of a workpiece to be inductively heated change along with temperature rise. In short, even when the number of the outer rings R present in the opposing region of the heating coil 2 is the same, the outer rings R arranged at a position relatively close to the heating start side, and the outer rings R arranged at a position relatively close to the heating finish side differ from each other in temperature rise pattern. Therefore, when the output patterns are set in the above-mentioned manner, all of the outer rings R sent to the heating step S1 can be heated to the target temperature.

In this case, normally, heat treatment is carried out on a steel material such as SUJ2 containing carbon of 0.8 mass % or more in such a manner that carbon of approximately 0.6 mass % is melted into austenite and then the residue is left as a carbide. This is because hardness change of martensite is small even when carbon of 0.6 mass % or more is melted into austenite, and because melt of excessive amount of carbon may cause residual austenite, that is, cause reduction in hardness and deterioration over time. Further, the remaining carbide contributes to suppression of growth of austenite grains during heating, and to enhancement of abrasion resistance of a workpiece. Further, a melting amount of carbon in the steel material depends on a heating temperature and a heating time period for a workpiece. In the heating method adopted in the present invention, the heating temperature can be adjusted by the output of the heating coil 2, and the heating time period can be adjusted by relative moving speed of the outer rings R (retaining unit 3) with respect to the heating coil 2. Therefore, the heat treatment method according to the present invention is suited particularly as a heat treatment method for the outer ring R made of SUJ2.

The embodiment of the present invention is described above, but the embodiment of the present invention is not limited to that described above.

For example, in the above-mentioned embodiment, the number of times of output variation of the heating coil 2 in the output increasing step S1a, and the number of times of output variation of the heating coil 2 in the output decreasing step S1c are set to the same number (three times in the both steps). However, it is not always necessary to set the number of times of output variation of the heating coil 2 in the both steps S1a and S1c to the same number, but the number of times of output variation of the heating coil 2 in the both steps S1a and S1c may be set to different numbers.

Further, in the above-mentioned embodiment, the plurality of outer rings R retained coaxially with each other are sequentially and inductively heated to the target temperature, and the outer rings R inductively heated to the target temperature are sequentially sent to the conveying step S2 and to the cooling step S3. However, the conveying step S2 and the cooling step S3 may be collectively carried out on the plurality of outer rings R inductively heated to the target temperature.

Further, in the above-mentioned embodiment, the direction of relatively moving the heating unit 2 and the retaining unit 3 (the plurality of outer rings R retained coaxially by the retaining unit 3) is set to the vertical direction, but the present invention is also applicable to a case where the heating unit 2 and the retaining unit 3 are relatively moved in a horizontal direction. Further, in the above-mentioned embodiment, the retaining unit 3 is pitch-fed (continuously fed in an intermittent manner), but the present invention is also suitably applicable to a case where the retaining unit 3 is smoothly and continuously fed.

Further, in the above description, the present invention is applied to the case of heat-treating the outer ring R as the ring-shaped member made of steel having a carbon content of 0.8 mass % or more. However, the present invention is also suitably applicable to a case of heat-treating a ring-shaped member made of steel having a carbon content of less than 0.8 mass % (such as S45C and S53C classified as carbon steel for machine structural use specified in JIS G4051).

Further, the heat treatment method according to the present invention is suitably applicable not only to the case of heat-treating the outer ring of a rolling bearing, but also to a case of heat-treating other kinds of ring-shaped members such as an inner ring of a rolling bearing, a sliding bearing, an outer joint member and an inner joint member constructing a constant velocity universal joint, and a cage incorporated into a rolling bearing or a constant velocity universal joint.

EXAMPLE

In order to demonstrate usefulness of the present invention, comparative verification was conducted on whether or not there was a difference in modes of heating a plurality of ring-shaped members between a case of inductively heating the plurality of ring-shaped members using the related-art method, and a case of inductively heating the plurality of ring-shaped members using the method according to the present invention. Here, the related-art method was carried out in such a manner that the plurality of ring-shaped members retained coaxially with each other, and a heating coil elongated more than the ring-shaped members and supplied with constant electric power were relatively moved in an axial direction, thereby sequentially and inductively heating the plurality of ring-shaped members to a target temperature. The method according to the present invention was carried out using the heat treatment apparatus 1 illustrated in FIG. 1 and the like. Note that, in the comparative tests, the goal was set to sequentially and inductively heat twenty outer rings made of SUJ2 and retained coaxially with each other to a temperature range of from 850° C. to 900° C. Then, of the twenty outer rings retained coaxially with each other, temperatures of five outer rings arranged on the heating start side, temperatures of five outer rings arranged at the vicinity of a center portion, and temperatures of five outer rings arranged on the heating finish side were measured after completion of induction heating. The results of measurement are shown in FIG. 5.

As is apparent from FIG. 5, in the related-art method (Comparative Example), only the outer rings arranged at the vicinity of the center portion were heated to the target temperature, whereas all of the outer rings arranged on the heating start side and the outer rings arranged on the heating finish side were heated to temperatures exceeding the target temperature. In contrast, in the method according to the present invention (Example), all of the outer rings arranged on the heating start side, at the vicinity of the center portion, and on the heating finish side were heated to a temperature within a range of the target temperature. Therefore, usefulness of the present invention was demonstrated.

REFERENCE SIGNS LIST 1 heat treatment apparatus
2 heating coil
3 retaining unit
4 cooling unit
5 high-frequency power source
R outer ring (steel ring-shaped member)
S1 heating step
S1a output increasing step
S1b intermediate step
S1c output decreasing step
S3 cooling step

The invention claimed is:

1. A heat treatment method for a ring-shaped member, the heat treatment method comprising a heating step of sequentially and inductively heating a plurality of ring-shaped members to a target temperature by energizing a heating coil elongated more than each of the plurality of ring-shaped members, which are made of steel and retained coaxially with each other, while relatively moving the plurality of ring-shaped members and the heating coil in an axial direction of each of the plurality of ring-shaped members, the heating step comprising:
an output increasing step of increasing an output of the heating coil each time a number of the ring-shaped members present in an opposing region of the heating coil increases by one; and
an output decreasing step of decreasing the output of the heating coil each time the number of the ring-shaped members present in the opposing region of the heating coil decreases by one.

2. The heat treatment method for a ring-shaped member according to claim 1, wherein an output increase pattern of the heating coil in the output increasing step and an output decrease pattern of the heating coil in the output decreasing step are different from each other.

3. The heat treatment method for a ring-shaped member according to claim 1, further comprising a cooling step of cooling one of the ring-shaped members inductively heated to the target temperature.

4. The heat treatment method for a ring-shaped member according to claim 1, wherein each of the ring-shaped members is made of steel having a carbon content of 0.8 mass % or more.

* * * * *